United States Patent [19]
Minami

[11] Patent Number: 4,560,197
[45] Date of Patent: Dec. 24, 1985

[54] DEVICE FOR GUIDING A VEHICLE SLIDING DOOR

[75] Inventor: Tatsuo Minami, Isehara, Japan

[73] Assignee: Nissan Shatai Co., Ltd., Kanagawa, Japan

[21] Appl. No.: 475,336

[22] Filed: Mar. 14, 1983

[30] Foreign Application Priority Data

Jun. 30, 1982 [JP] Japan .............................. 57-98764[U]

[51] Int. Cl.$^4$ ......................... B60J 5/06; E05D 13/00
[52] U.S. Cl. ..................................... 296/155; 49/213
[58] Field of Search ............................. 296/155, 146; 49/213–215

[56] References Cited

U.S. PATENT DOCUMENTS

| 903,406 | 11/1908 | Rickabaugh | 49/214 |
| 969,192 | 9/1910 | Richards | 49/214 |
| 4,152,872 | 5/1979 | Tanizaki et al. | 49/214 |
| 4,413,444 | 11/1983 | Chikaraishi | 296/155 |
| 4,433,507 | 2/1984 | Chikaraishi | 49/213 |

FOREIGN PATENT DOCUMENTS

| 0022913 | 2/1982 | Japan | 296/155 |
| 1016890 | 1/1966 | United Kingdom | 49/215 |
| 1206898 | 9/1970 | United Kingdom | 296/155 |

Primary Examiner—Robert B. Reeves
Assistant Examiner—Dennis H. Pedder
Attorney, Agent, or Firm—Yuter, Rosen & Dainow

[57] ABSTRACT

For the purpose of preventing a vehicle sliding door from falling off, a stopper member is fixedly secured to the vehicle body and a coacting surface is provided on a bracket mounted on the vehicle door. As guide rollers of the vehicle sliding door tilt under an external force applied to the vehicle door, the stopper member engages with the coacting surface and prevents the rollers from derailment. Since the stopper member extends laterally, it is effective for preventing the sliding door from falling off even when the sliding door is deformed.

6 Claims, 7 Drawing Figures

DEVICE FOR GUIDING A VEHICLE SLIDING DOOR

TECHNICAL FIELD

This invention relates to a device for guiding a vehicle sliding door and in particular to an improved guide rail structure which is provided with a means for preventing derailment of the sliding door from the guide rail.

BRIEF DESCRIPTION OF THE DRAWINGS

The invention and prior art are described in the following with respect to the drawings, in which.

BACKGROUND ART

Figure 2:
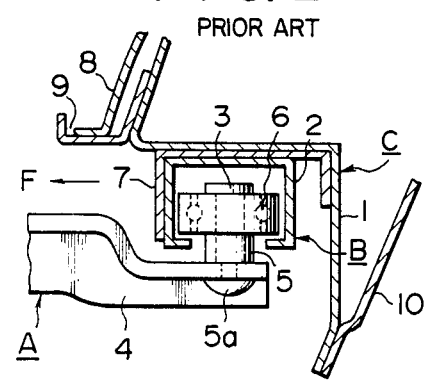
FIG. 2 is a cross-sectional view of a conventional guide rail structure for a vehicle sliding door.

Conventionally, a vehicle sliding door A was typically supported in position by rollers 3 which are rotatably mounted on shaft 5 to a bracket 4 of the sliding door A and constrained roll along the interior surfaces of a guide rail member 2 fixedly secured to a roof inner panel 1, as shown in FIG. 2. In FIG. 2, numeral 8 denotes a roof outer panel, numeral 9 a trough provided along the side of the roof, and numeral 10 a roof side rail.

It is however known that the sliding door A has a tendency to apply a great force F to the guide rail B in the direction indicated by an arrow in FIG. 2, by way of the rollers 3 acting directly upon the guide rail member 2.

Therefore, it was necessary to increase the rigidity of the guide rail structure B and the guide rollers 3, for instance, by increasing the diameter of roller bearing shafts 5, using large crimped mounting portions 5a for the roller bearing shafts 5 and increasing the size of roller bearings 6. Additionally, it was necessary to increase the rigidity of the front end of the guide rail structure B by reinforcing the front end of the guide rail member 2 with a large bracket 7 against possible deformation of the front end of the guide rail member 2.

However, such reinforcement measures give rise to various drawbacks, such as a large protrusion, resulting from the use of a large roller assembly 3, 5, 6 and 6a, into the passenger compartment of the vehicle in which the restriction on space is very severe, increased cost and labor arising from the addition of extra component parts and so on.

DISCLOSURE OF THE INVENTION

In view of such shortcomings of conventional devices for guiding a vehicle sliding door, a primary object of this invention is to provide a device for guiding a vehicle sliding door which can effectively prevent the sliding door from falling off without involving the need to increase the rigidity of the structure.

Another object of this invention is to provide a device for guiding a vehicle sliding door which can prevent the sliding door from falling off by incorporating a small structure which requires little additional cost and labor for incorporation.

Yet another object of this invention is to provide a device for guiding a vehicle sliding door which does not cause any excessive protrusion into the passenger compartment of the vehicle.

According to the present invention, such objects are accomplished by providing a device for guiding a vehicle sliding door in which a stopper piece having a vertical wall is provided on a vehicle body near the front end of a guide rail member at a small distance away from the guide rail member and a second vertical wall is provided in a bracket mounted on the vehicle door projecting toward the guide rail member so that the first vertical wall opposes the second vertical wall from outside of the latter.

Now the present invention is described in the following with respect to a specific embodiment with reference to FIGS. 3 to 7.

Figure 1:
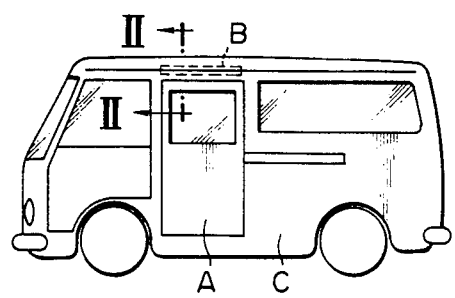
FIG. 1 is a schematic side view of a typical vehicle having a sliding door.
Figure 3:
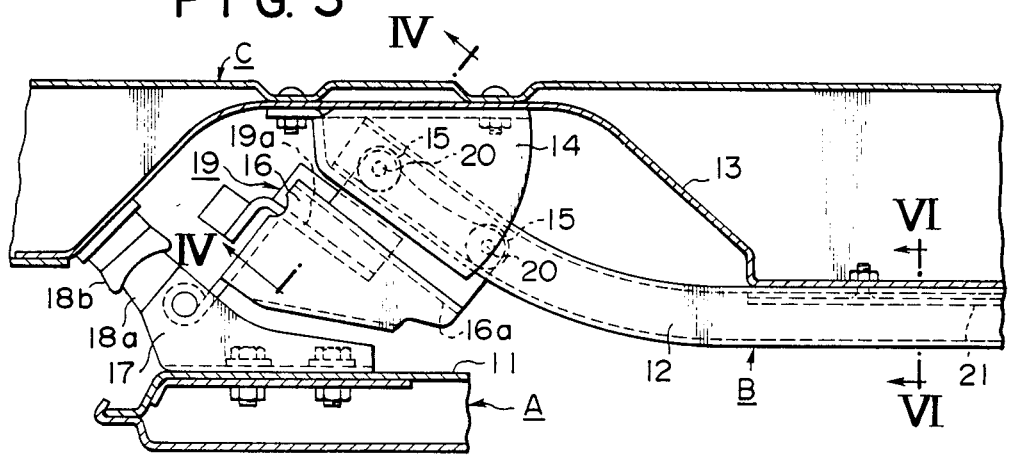
FIG. 3 is a sectional plan view of a guide rail structure for a vehicle sliding door according to this invention.
Figure 5:
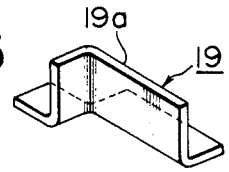
FIG. 5 is a perspective view of the stopper piece shown in FIG. 4.

FIG. 3 is a sectional plan view showing a longitudinal sectional view of the upper guide rail structure B corresponding to the upper rail B in FIG. 1. Numeral 12 denotes a guide rail member which is mounted on a vehicle body 13 and curves inwardly at its front end. A guide rail bracket 14 fixedly secures the front end of the guide rail member 12 and reinforces the front end of the guide rail member 12 at the same time.

A pair of guide rollers 15 travelling inside the guide rail member 12 are, by way of shafts 20, rotatably mounted to a roller bracket 16 which is in turn hinged to another bracket 17 fixedly secured to a door panel 11. The hinge pivots about a vertical axis (FIG. 3). An elastic piece 18a is affixed to a front end of the door bracket 17 and another elastic piece 18b is affixed to a corresponding portion of the vehicle body 13 so that these elastic pieces 18a and 18b function as a stopper defining the fully closed state of the vehicle door A.

Figure 6:
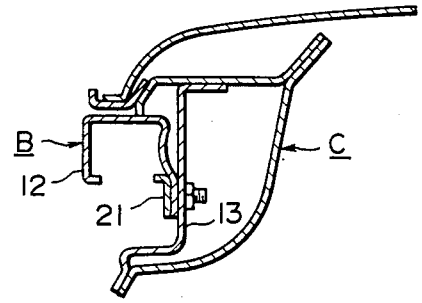
FIG. 6 is a cross-sectional view taken along line VI—VI of FIG. 3.
Figure 7:
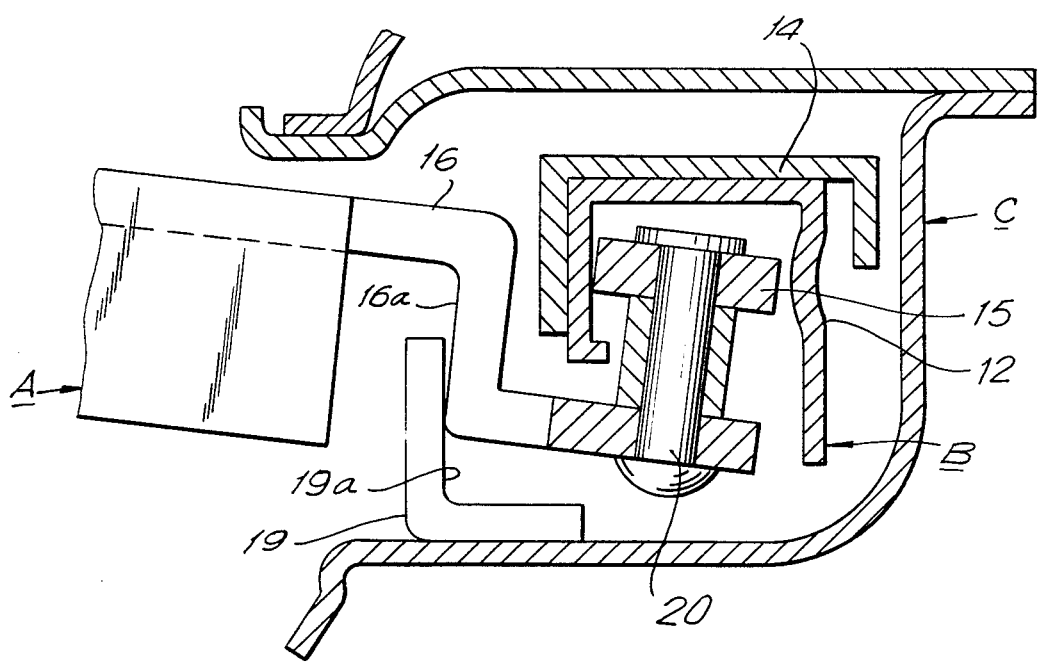
FIG. 7 is a view similar to FIG. 4 illustrating the contact of elements produced by an external force acting outward on thd door.

As a means of reinforcing the guide rail member 12, a sub guide rail 21 having an inverted L-shaped cross-section is fixedly secured to the vehicle body along the inner side of the guide rail member 12 so that an inwardly turned flange on the outwardly projecting side end of the guide rail member 12 a projecting leg of the sub guide rail member 21 oppose one another at the bottom portion of the guide rail B (FIG. 6). This L-shaped sub guide rail 21, extends substantially along the whole length of the guide rail member 12, functions as a reinforcement for the guide rail member 12 on one hand and as an auxiliary member for preventing the escape of the rollers 15 from the interior of the guide rail member 12, on the other hand. The sub guide rail 21 prevents escape of the roller 15 in cooperation with the inwardly turned flange on the outwardly projecting side of the guide rail member at its bottom portion.

Figure 4:
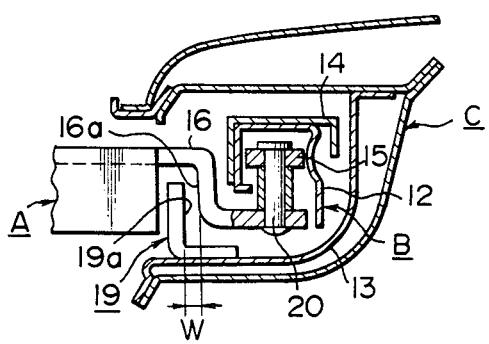
FIG. 4 is a cross-sectional view taken along line IV—IV of FIG. 3.

The roller bracket 16 has a vertical wall 16a in its middle portion formed by bending the bracket member about a substantially horizontal line. A stopper piece 19 including a vertical wall 19a is fixedly secured to the vehicle body 13 substantially outwardly of the first vertical wall 16a and of the end of guide rail 12 so that its vertical wall 19a opposes the vertical wall 16a of the roller bracket 16 with a small distance W between them (FIG. 4). The two opposing vertical walls 16a and 19a both extend laterally for selected lengths (FIG. 3) and walls 16a, 19a, and guide rail 12 are generally parallel at the front end of guide rail 12.

This vertical wall 19a of the stopper piece 19 does not interfere with the vertical wall 16a of the bracket 16 when the sliding door A opens and closes under normal condition. However, when the sliding door A is subjected to an external force which pulls the sliding door A away from the vehicle body C, the guide rollers 15 support a part of the force and become inclined with the result that the vertical wall 19a of the stopper piece 19 comes into contact with the vertical wall 16a of the bracket 16, thereby opposing the force acting on the rollers 15 and preventing excessive deformation in the roller shafts 20. Furthermore, since the vertical walls 19a and 16a extend also laterally over selected lengths, even in the presence of a small displacement of the sliding door A, for instance, due to a fixed deformation of the sliding door A, the vertical wall 19a continues to oppose the force and the stopper piece 19 does not lose its function. The stopper piece 19 is L-shaped in crossection (FIG. 4) and the extension from the vertical wall 19a connects to the vehicle body 13 and supports the stopper piece against pressure applied to the vertical wall 19a.

According to this invention, the stopper piece 19 thus prevents the roller 20 from falling off the guide rail member 12 when the sliding door A is subjected to an external force. The vertical walls 19a and 16a of the stopper piece 19 and the roller bracket 16 oppose the force, after the roller shafts 20 have tilted beyond a certain limit.

Furthermore, since the vertical motion of the roller bracket 16 is limited in both directions, with the rollers 15 contacting the ceiling of the guide rail member 12 on one hand and the bottom of the bracket 16 contacting the top of the support member 19 on the other hand, the bracket 16 and the sliding door A itself are prevented from disengagement with the vehicle. And, since this stopper piece 16 is mounted on the vehicle body C and not on the guide rail B, it can be constructed to have a great mechanical strength and may be provided in many different ways.

Although the present invention was described with respect to its specific embodiment, it is obvious to a person skilled in the art that various modifications and variations are possible without departing from the spirit of this invention described in the appended claims.

What is claimed is:

1. A device for guiding a sliding door on the body of a vehicle, comprising:

a guide rail for said sliding door, said rail being mounted on said body and extending generally in the front to rear direction of said vehicle;

a bracket mounted on said sliding door, said bracekt having a first wall and a guide roller rotatably disposed to travel along said rail, said guide rail being mounted on said vehicle body;

a stopper piece, separate from the guide rail and fixedly secured to the vehicle body at a position adjacent to one end of the guide rail, the stopper piece positioned laterally outwardly from said one end of the guide rail, said stopper piece including a second wall, said second wall being positioned relative to said vehicle body outside said first wall and opposite to said first wall when said sliding door is at a closed position, an open space separating the entire opposed surfaces of said first and second walls in said opposite position when said door is closed, said first wall of the bracket and said second wall of the stopper piece not interfering with each other when the sliding door is opened and closed in normal operation, said first wall coming into contact with said second wall, which thereafter restrains said first wall, when said guide roller is inclined by an external force applied to the sliding door, said force pulling said door away from the vehicle body.

2. A device for guiding a vehicle sliding door according to claim 1, wherein said stopper piece is substantially L-shaped in crossection and extends generally parallel to said guide rail at said one end.

3. A device for guiding a vehicle sliding door according to claim 2, wherein said bracket is hinged to said sliding door.

4. A device for guiding a vehicle sliding door according to claim 2, wherein said L-shaped stopper piece comprises an extension from said second wall, said extension being fixedly secured to said body and restraining said stopper piece against pressure applied to said second wall during said contact between said first and second walls.

5. A device for guiding a vehicle sliding door according to claim 4, wherein said first wall is the product of bending a portion of said bracket.

6. A device for guiding a vehicle sliding door according to claim 1, wherein said bracket is hinged to said sliding door.

* * * * *

UNITED STATES PATENT AND TRADEMARK OFFICE
CERTIFICATE OF CORRECTION

PATENT NO. : 4,560,197

DATED : December 24, 1985

INVENTOR(S) : Tatsuo Minami

It is certified that error appears in the above-identified patent and that said Letters Patent is hereby corrected as shown below:

```
Column 1, line 30, "thd" should read -- the --.
Column 1, line 36, after "constrained" insert -- to --.
Column 2, line 50, omit "end".
Column 2, line 50, after "12" insert -- and --.
Column 4, line 7, "bracekt" should read -- bracket --.
```

Signed and Sealed this

Sixteenth Day of September 1986

[SEAL]

Attest:

DONALD J. QUIGG

Attesting Officer     *Commissioner of Patents and Trademarks*